Reissued July 5, 1938 Re. 20,784

UNITED STATES PATENT OFFICE 20,784

LUBRICATING OIL

John M. Musselman and Herman P. Lankelma, Cleveland, Ohio, assignors to The Standard Oil Company (Ohio), Cleveland, Ohio, a corporation of Ohio No Drawing. Original No. 2,097,162, dated October 26, 1937, Serial No. 42,887, September 30, 1935. Application for reissue December 1, 1937, Serial No. 177,612

2 Claims. (Cl. 87—9)

This invention relates to mineral oils, and more particularly oils which are subjected to usage in high temperature exposure; and it is among the objects of the invention to provide an oil which is resistant against degradation changes, and with excellent lubricating properties.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

It has been known for some time that mineral oils to which small quantities of certain agents have been added are more durable in transformers and in lubricating usage, the action being ascribed to prevention of oxidation. We have found however, that where oils are subjected to high temperature usage, as for instance in internal combustion engine crank cases, the factors making for degradation of the oil are not so simple, but involve complex action, including apparent polymerization and molecular change, and in such usage we have found certain compositions which are particularly durable and effective in drastic usage.

In accordance with the present invention, a mineral oil of greater or less viscosity, as preferred in any given instance, oils for example from a viscosity of 47 sec. S. U. at 210° F. to 190 sec. S. U. at 210° F. are employed, and with the oil is incorporated one or more phenyl compounds of the following: tetramethyl - diaminodiphenylmethane, symmetrical diphenylethylenediamine, para-acetylaminophenol, xylenols, phenyl beta-naphthylamine. The proportion of such phenyl compound may range from 0.001 to 5 per cent, but amounts of less than 1 per cent are ordinarily sufficient.

As an example: 0.01 per cent of symmetrical diphenylethylenediamine is incorporated with a lubricating oil of 53 sec. at 210° F., being thoroughly mixed.

As another example: 0.01 per cent of xylenols is mixed with a lubricating oil of 53 sec. at 210° F.

Other modes of applying the principle of the invention may be employed, change being made as regards the details described, provided the features stated in any of the following claims, or the equivalent of such, be employed.

We therefore particularly point out and distinctly claim as our invention:—

1. A process of inhibiting degradation of mineral lubricating oils in exposure to heat, which comprises incorporating with the oil a degradation-inhibiting amount of tetramethyldiaminodiphenylmethane.

2. A mineral lubricating oil containing a degradation-inhibiting amount of tetramethyldiaminodiphenylmethane.

JOHN M. MUSSELMAN.
HERMAN P. LANKELMA.